United States Patent [19]

Jensen

[11] 4,009,891

[45] Mar. 1, 1977

[54] HAND TRUCKS

[76] Inventor: Oystein Jensen, 8355 Ny Solbjerg, Onstedvej 9, Denmark

[22] Filed: July 1, 1974

[21] Appl. No.: 485,040

[52] U.S. Cl. .......................... 280/651; 280/47.2; 280/47.27

[51] Int. Cl.[2] .......................................... B62B 3/02

[58] Field of Search .............. 280/36 R, 47.2, 79.2, 280/47.18, 638, 639, 651, 30, 47.27, 79.1

[56] References Cited

UNITED STATES PATENTS

| 627,284 | 6/1899 | Walker | 280/47.2 X |
|---|---|---|---|
| 2,598,168 | 5/1952 | Hooz et al. | 280/47.2 X |
| 2,715,031 | 8/1955 | Danielsson | 280/36 R |
| 3,064,990 | 11/1962 | Salvucci | 280/36 R |
| 3,850,441 | 11/1974 | Peters et al. | 280/47.2 |

Primary Examiner—Robert R. Song
Assistant Examiner—Michael J. Forman
Attorney, Agent, or Firm—William Anthony Drucker

[57] ABSTRACT

A hand truck having a wheel supported chassis provided with wheel shafts at the front end and the rear end thereof, an article carrier frame being pivotally secured to the said front end of the chassis so as to be swingable between an upright charging position and a rearwardly inclined transport position, and means being provided for supporting the carrier frame in this position relatively to the chassis, characterized in that the chassis is made in such a manner that the rear wheel shaft is movable towards and away from the front wheel shaft, and between the carrier frame and the rear wheel shaft to be moved rearwardly in response to the carrier frame being tilted rearwardly from its upright position.

7 Claims, 4 Drawing Figures

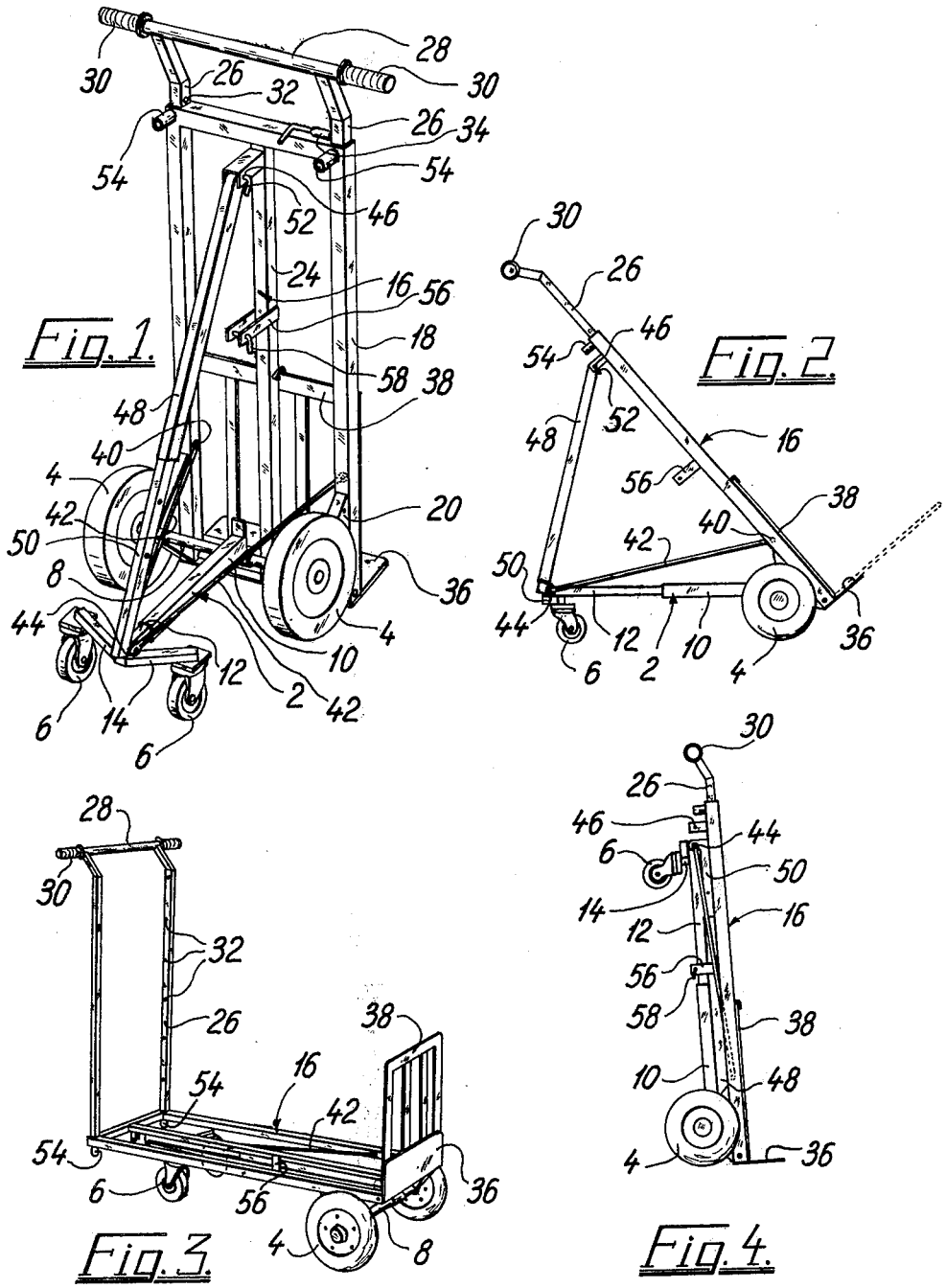

HAND TRUCKS

The present invention relates to a hand truck having a wheel supported chassis provided with wheel shafts at the front end and the rear end thereof, an article carrier frame being pivotally secured to the said front end of the chassis so as to be swingable between an upright charging position and rearwardly inclined transport position, and means being provided for supporting the carrier frame in this position relatively to the chassis. Hand trucks of this type are advantageous over the simple, tiltable "bag trucks" thereby that the operator after having tilted back the carrier frame to the inclined transport position shall not carry the weight of the article, since the frame is supported by the chassis, and the wheels thereof.

However, there is also a disadvantage connected with the use of a chassis having one or two rear wheels in addition to the front wheels, viz. that the presence of the rear wheels makes it difficult for the operator to get close to the rear side of the carrier frame when he shall tilt the frame rearwardly. The distance between the front and the rear wheels, therefore, should be rather small, but on the other hand it is, of course, also desirable that this distance be as long as possible in order to obtain a safe support for the article when the frame has been tilted rearwardly, and the actual distance to be preferred will thus be a compromise which is in fact dissatisfactory in both of the said respects.

It is the purpose of this invention to provide a hand truck of the type referred to in which the rear wheel or wheels are arranged in such a manner that in the transport position they are well spaced from the front wheels without making it difficult for the operator to get close to the carrier frame when he shall tilt it for loading the truck.

According to the invention the chassis is made in such a manner that the rear wheel shaft is movable towards and away from the front wheel shaft, and between the carrier frame and the rear wheel shaft there is provided means for causing the rear wheel shaft to be moved rearwardly in response to the carrier frame being tilted rearwardly from its upright position. It will be appreciated that hereby the rear wheels may be situated close to the front wheels when the frame is upright, while as the carrier frame is tilted the rear wheels are displaced rearwardly so as to ensure, in their final position, that the tilted frame and the article resting thereon is supported in a safe manner.

By way of example the invention is described in more detail in the following, reference being made to the accompanying drawings in which:

FIG. 1 is a perspective view of a hand truck according to a preferred embodiment of the invention, shown with the carrier frame in its upright loading position, FIG. 2 is a side view of the truck showing the carrier frame in its tilted transport position, FIG. 3 is a perspective view of the truck used as a push cart, and FIG. 4 is a side view of the truck shown with the chassis and the carrier frame folded together.

The hand truck shown comprises a lower support chassis 2 having front wheels 4 and rear wheels 6, the front wheels 4 being interconnected by a wheel shaft 8 to which there is secured a rearwardly projecting telescopic tube 10 having an outer portion 12 which is slidingly received in the tube 10 and is provided with rigid carrier arms 14 for the wheels 6, these wheels being of the swivel type.

To the front wheel shaft 8 there is pivotally secured a carrier frame 16 having side beams with rearwardly projecting bracket plates 20 connected to the shaft 8. Between the side beams 18 there is located a central vertical rod 24. The side beams 18 are tubes which receive in telescopic manner the downwardly protruding side rods 26 of an upper handle structure 28 provided with handles 30. The rods 6 are provided with a row of transverse holes 32 whereby the structure 28 may be locked to the beams 18 by means of a latch 34 in a number of different height positions relatively to the frame 16. At the lower end of the frame 16 there is provided a forwardly protruding carrier plate 36, and a larger carrier plate 36 so as to be swingable between a position folded up against the frame 16 and a position swung out therefrom and supported by the plate 36, as indicated in dotted lines in FIG. 2, whereby a larger support can be provided according to the requirements.

To the sidebeams 18, at points 40 spaced above the wheel shaft 8, there is pivotally secured the front ends of a pair of rods 42 which are at their rear ends at 44 pivotally connected to the supporting structure 12, 14, of the rear wheels 6. Therefore, when the frame 16 is tilted rearwardly the rods 42 will be pushed rearwardly and thereby cause the rear portion 12 of the telescopic tube 10 and there with the rear wheels 6 to be moved rearwardly relatively to the front wheel shaft 8.

Between the support structure 12, 14 of the rear wheels 6 and a point 46 of the frame 16 adjacent the upper end thereof there is mounted a telescopic tube 48, 50 pivotally secured at its opposite ends to the respective parts. When the frame 16 is tilted rearwardly the upper telescopic tube portion 48 will move downwardly and stop the tilting of the frame when its lower end reaches a stop which may be either a cross pin mounted in one of a row of cross holes in the lower tube portion 50 or — as actually shown in FIG. 2 — simply constituted by the support structure 12, 14 of the rear wheels 6 at the lower end of the tube portion 50.

In this manner it is ensured that the carrier frame when swung rearwardly will be stopped in a suitably inclined position and thereafter be supported entirely by the chassis 2 with the rear wheels 6 located in a position well spaced from the front wheels so that in all normal cases the point of gravity of the load on the truck will be within the support surface as defined by the wheels.

The telescopic stop rod 48, 50 is releasably connected to the frame 16 by means of a locking pin 52. Upon removal of this pin the rod may be telescoped together and then swung down so as to be rested on the lower telescopic tube 10. Then the frame 16 can be swung down to a horizontal position as illustrated in FIG. 3 in which the truck is usable as a push cart. The handle structure 28 can be lifted off from the side beams 18 and placed as shown in FIG. 3 with its lower ends received in sockets 54 so as to project upwardly from the horizontal frame for use as a combined handle and front load support. Instead of the sockets 54 there may be provided a hinge connection between the upper end of the frame 16 and the lower ends of the handle rods 26.

As most clearly shown in FIG. 1 the middle frame rod 24 has a rearwardly protruding bracket 56 provided with a releasable cross bolt 58. This bolt is removed when the frame 16 is folded together with the chassis 2 as shown in FIG. 3 and also in FIG. 4, and after the folding together the bolt 58 is remounted whereby the two telescopic tubes 10 and 48 are locked to the rear side of the frame 16. It is possible, therefore, to use the truck as an ordinary two-wheeled hand truck as shown in FIG. 4 and besides it is possible to convert the truck into a push cart by swinging up the chassis, locking it to the frame 16 and then swinging down the frame and the chassis.

It is a main feature of the invention that the rear wheel holder is automatically moved rearwardly when the carrier frame 16 is swung rearwardly, but the invention is not limited to the use of a telescopic arrangement for guiding the rear wheel suspension. Alternatively there may be used e.g. a rod system of the scissors type and besides instead of the connector rods 42 there may be used other means such as a cog wheel cooperating with a tooth rack for causing the rear wheel suspension to be moved rearwardly in response to a rearward tilting of the frame 16.

What is claimed is:

1. A hand truck comprising a driving chassis having a front end portion and a rear end portion and a telescopic tube arranged therebetween so as to allow the distance between said front and rear end portions to be varied, front wheel means mounted on said front end portion and rear wheel means mounted on said rear end portion so as to be operable to support the driving chassis on the ground with said telescopic tube substantially parallel therewith, an article carrier frame element pivotally secured to said front end portion of said chassis so as to be pivotal relative to the ground supported driving chassis between an upright loading position substantially perpendicular to the driving chassis and a tilted transport position in which the carrier frame is inclined rearwardly over the carrier chassis so as to form an actue angle therewith, carrier frame element support means interposed between said carrier frame element and said driving chassis so as to be operable to support the frame element in its said transport position relatively to the driving chassis, and a connector rod hinged at its opposite ends to said rear chassis end portion and a point of said frame element above the pivoting axis of the frame element, respectively, so as to be operable to cause said telescopic tube to expand and said rear chassis end portion to be displaced away from said front chassis end portion in direct response to the carrier frame element and the driving chassis being mutually pivoted to diminish the angle therebetween, while correspondingly being operable to cause said telescopic tube to contact and said rear chassis end portion to be displaced towards said front chassis end portion in direct response to the carrier frame element and the driving chassis being mutually pivoted to enlarge the angle between them.

2. A hand truck according to claim 1, in which said distance control means comprise a connector rod hinged at its opposite ends to said rear chassis end portion and a point of said frame element above the pivoting axis of the frame element, respectively.

3. A hand truck according to claim 1 and comprising locking means for releasably locking together the driving chassis and the carrier frame element in the horizontal transport position of said element.

4. A hand truck according to claim 1, in which said carrier frame element support means comprises a telescopic tube system interposed between a point adjacent the upper end of the carrier frame element above said point in which said connector rod is hinged to the frame element and a point of said rear end portion of the driving chassis, the telescopic tube system being length variable between an expanded position corresponding to the carrier frame assuming its upright loading position and a shortened pressure absorbing position corresponding to the frame element assuming its inclined transport position.

5. A hand truck according to claim 5, and comprising a handle structure releasably associated with said carrier frame element so as to normally extend therealong from a lower end portion adjacent the lower end of the frame element to an upper end portion adjacent the upper end of the frame element, said upper end portion being provided with handle means, the upper end portion of the carrier frame element comprising means for receiving and holding said lower end portion of said handle structure upon release of this structure from its normal position on the carrier frame element so as to be operable to hold the handle structure in a position in which it projects from the upper end of the carrier frame element generally orthogonally to the plane of the carrier frame element, so as to project upwardly when the frame element assumes its horizontal transport position.

6. A hand truck comprising a driving chassis having a front end portion and a rear end portion, front wheel shaft means connected to said front end portion and provided with front support wheel means, rear wheel shaft means connected to said rear end portion and provided with rear support wheel means, an article carrier frame element pivotally secured to said front end portion of said chassis so as to be pivotal relatively to the entire driving chassis between an upright loading position and a rearwardly inclined transport position, carrier frame element support means interposed between said carrier frame element and said driving chassis so as to be operable to support the frame element in its said transport position relatively to the driving chassis, said front and rear end portions of said chassis being interconnected by connector means allowing the distance between the front and the rear wheel shaft means to be varied, and distance control means operatively connected with said carrier frame element and said driving chassis so as to cause the distance between the front and rear wheel shaft means to increase in response to the carrier frame element being tilted rearwardly relatively to the driving chassis towards its transport position and to cause the side distance to be decreased in response to said carrier frame element being tilted forwardly relatively to the driving chassis its said upright position, in which said carrier frame element support means are releasable so as to allow, when released, said carrier frame element to be tilted further downwardly and rearwardly from said inclined transport position to a generally horizontal transport position supported on said driving chassis, said distance control means further being responsive to tilting of the carrier frame element between said inclined and said generally horizontal transport positions so as to be operable to increase the distance between said front and rear wheel shaft means to a relative maximum in response to the carrier frame element being tilted down into its said generally horizontal transport position.

7. A hand truck comprising a driving chassis having a front end portion and a rear end portion, front wheel shaft means connected to said front end portion and provided with front support wheel means, rear wheel shaft means connected to said rear end portion and provided with rear support wheel means, an article carrier frame element pivotally secured to said front end portion of said chassis so as to be pivotal relatively to the entire driving chassis between an upright loading position and a rearwardly inclined transport position, carrier frame element support means interposed between said carrier frame element and said driving chassis so as to be operable to support the frame element in its said transport position relatively to the driving chassis, said front and rear end portions of said chassis being interconnected by connector means allowing the distance between the front and the rear wheel shaft means to be varied, and distance control means operatively connected with said carrier frame element and said driving chassis so as to cause the distance between the front and rear wheel shaft means to increase in response to the carrier frame element being tilted rearwardly relatively to the driving chassis towards its transport position and to cause the said distance to be decreased in response to said carrier frame element being tilted forwardly relatively to the driving chassis its said upright position, in which said carrier frame element support means comprises a telescopic tube system interposed between a point adjacent the upper end of the carrier frame element and a point of said rear end portion of the driving chassis, the telescopic tube system being length variable between an expanded position corresponding to the carrier frame assuming its upright loading position and a shortened pressure absorbing position corresponding to the frame element assuming its inclined transport position, in which one end of said telescopic tube system is releasably connected to the respective said point so as to allow, when released, the carrier frame element to be folded together with said driving chassis.

* * * * *